United States Patent [19]

Campbell et al.

[11] 4,172,403

[45] Oct. 30, 1979

[54] METHOD AND APPARATUS FOR ENCODING OF EXPRESSION WHILE RECORDING FROM THE KEYBOARD OF AN ELECTRONIC PLAYER PIANO

[75] Inventors: Joseph M. Campbell, Lewisburg; Larry J. Minyard, Columbia, both of Tenn.

[73] Assignee: Teledyne Industries, Inc., Los Angeles, Calif.

[21] Appl. No.: 828,068

[22] Filed: Aug. 26, 1977

[51] Int. Cl.[2] .......... G10H 3/00; G11B 5/09

[52] U.S. Cl. .......... 84/1.28; 84/1.27; 84/DIG. 29; 360/32; 346/33 M

[58] Field of Search .......... 84/1.01, 1.03, 1.09, 84/1.1, 1.24, 1.27, DIG. 29, 115, 1.28; 307/350; 346/33 M; 360/32

[56] References Cited

U.S. PATENT DOCUMENTS

| | | | |
|---|---|---|---|
| 3,604,299 | 9/1971 | Englund | 84/1.28 |
| 3,771,406 | 11/1973 | Wheelwright | 84/DIG. 29 |
| 3,868,882 | 3/1975 | Fukui | 84/115 |
| 3,905,267 | 9/1975 | Vincent | 84/1.03 |
| 3,914,701 | 10/1975 | Burdick | 307/350 |

*Primary Examiner*—Gene Z. Rubinson
*Assistant Examiner*—William L. Feeney
*Attorney, Agent, or Firm*—Jim Zegeer

[57] ABSTRACT

There is disclosed a method and apparatus for encoding of expression while recording from the keyboard of an electronic player piano wherein the intensity of the music being recorded is reflected in variations in the power of the acoustic waveform produced thereby. There is a delay between the time the key is struck and the time that the note is sounded or heard by the listener. The apparatus measures the changes in power by performing a digital integration of a waveform. The key note or key switch actuations are multiplexed and a serial bit stream of data and stored in a shift register and then combined with the expression data bits to form the data stream which is encoded in a bi-phase encoder to be recorded on tape.

13 Claims, 5 Drawing Figures

| | | | |
|---|---|---|---|
| T0- | 1 | SOFT PEDAL | |
| | 2 | SUSTAIN PEDAL | |
| | 3 | SPARE BIT | |
| | 4 | 1 LSB | BASS EXPRESSION |
| | 5 | 2 | |
| | 6 | 3 | |
| | 7 | 4 | |
| | 8 | 5 MSB | |
| T1- | 9 | | SPARE BITS |
| | 10 | | |
| | 11 | | |
| | 12 | | |
| | 13 | | |
| | 14 | | |
| | 15 | | |
| | 16 | | |
| T2- | 17 | C#3 | |
| | 18 | D 3 | |
| | 19 | D#3 | |
| | 20 | E 3 | |
| | 21 | F 3 | |
| | 22 | F#3 | |
| | 23 | G 3 | |
| | 24 | G#3 | |
| T3- | 25 | A 3 | |
| | 26 | A#3 | |
| | 27 | B 3 | |
| | 28 | C 2 | |
| | 29 | C#2 | |
| | 30 | D 2 | |
| | 31 | D#2 | |
| T4- | 32 | E 2 | |
| | 33 | F 2 | |
| | 34 | F#2 | |
| | 35 | G 2 | |
| | 36 | G#2 | |
| | 37 | A 2 | |
| | 38 | A#2 | |
| | 39 | B 2 | |
| | 40 | C 1 | |
| T5- | 41 | C#1 | |
| | 42 | D 1 | |
| | 43 | D#1 | |
| | 44 | E 1 | |
| | 45 | F 1 | |
| | 46 | F#1 | |
| | 47 | G 1 | |
| | 48 | G#1 | |
| T6- | 49 | A 1 | |
| | 50 | A#1 | |
| | 51 | B 1 | |
| | 52 | C | |
| | 53 | C# | |
| | 54 | D | |
| | 55 | D# | |
| | 56 | E | |
| T7- | 57 | | SPARE BITS |
| | 58 | | |
| | 59 | | |
| | 60 | | |
| | 61 | | |
| | 62 | | |
| | 63 | | |
| | 64 | | |
| T8- | 65 | | |
| | 66 | | |
| | 67 | SPARE BIT | |
| | 68 | 1 LSB | TREBLE EXPRESSION |
| | 69 | 2 | |
| | 70 | 3 | |
| | 71 | 4 | |
| | 72 | 5 MSB | |
| T9- | 73 | E | |
| | 74 | F# | |
| | 75 | G | |
| | 76 | G# | |
| | 77 | A | |
| | 78 | A# | |
| | 79 | B | |
| T10- | 80 | C 1 | |
| | 81 | C#1 | |
| | 82 | D 1 | |
| | 83 | D#1 | |
| | 84 | E 1 | |
| | 85 | F 1 | |
| | 86 | F#1 | |
| | 87 | G 1 | |
| | 88 | G#1 | |
| T11- | 89 | A 1 | |
| | 90 | A#1 | |
| | 91 | B 1 | |
| | 92 | C 2 | |
| | 93 | C#2 | |
| | 94 | D 2 | |
| | 95 | D#2 | |
| | 96 | E 2 | |
| T12- | 97 | F 2 | |
| | 98 | F#2 | |
| | 99 | G 2 | |
| | 100 | G#2 | |
| | 101 | A 2 | |
| | 102 | A#2 | |
| | 103 | B 2 | |
| | 104 | C 3 | |
| T13- | 105 | C#3 | |
| | 106 | D 3 | |
| | 107 | D#3 | |
| | 108 | E 3 | |
| | 109 | F 3 | |
| | 110 | F#3 | |
| | 111 | G 3 | |
| | 112 | G#3 | |
| T14- | 113 | | SPARE BITS |
| | 114 | | |
| | 115 | | |
| | 116 | | |
| | 117 | | |
| | 118 | | |
| | 119 | | |
| | 120 | | |
| T15- | 121 | 1 | SYNCHRONIZATION BITS |
| | 122 | 1 | |
| | 123 | 1 | |
| | 124 | 1 | |
| | 125 | 1 | |
| | 126 | 1 | |
| | 127 | 0 | |
| | 128 | 1 | |

FIG 2

METHOD AND APPARATUS FOR ENCODING OF EXPRESSION WHILE RECORDING FROM THE KEYBOARD OF AN ELECTRONIC PLAYER PIANO

BACKGROUND OF THE INVENTION AND BRIEF DESCRIPTION THEREOF

The present invention relates to a method and apparatus for recording keyboard music for re-creation on a similar keyboard instrument by actuation of the keys and, more particularly, to the detection, encoding, recording and reproduction of expression effects on electronic keyboard instruments. Expression control has been provided in a number of ways in the prior art. As disclosed in Vincent U.S. Pat. No. 3,905,267, transducers, such as microphones, accelerometers or magnetic pickups produce voltages which are proportional to the intensity with which the keys are struck. The information is then digitized in an analog to digital converter and combined with the keyboard switch actuation signals. These systems do not take into account the delay between the key switch actuation and the actual production of the musical note involved nor do they take into account the mechanical differences between the production of notes in the treble range as compared to the production of notes in the bass range. Finally, the digital multiplex word format placed the expression bits for both bass expression and treble expression in one position in each frame after the key switch bit data.

In accordance with the present invention, the expression effect utilizes a single simple microphone to detect the variations in the intensity of the acoustic waveform music being recorded and senses the changes in power by performing a digital integration of the waveform produced by the microphone. The output of the microphone, however, is first preamplified and then applied to a low pass filter for the bass notes and a high pass filter for the treble notes. When the music waveform for either the bass or treble section of the keyboard is greater than the threshold, a clocking signal is allowed to advance a binary 5-bit counter unit with a 31-count range. The counting system is adjusted by presetting the d.c. bias level so that the maximum volume required from the piano in either the bass or treble section produces the maximum count (31) from the counter. Thus, the longer the music waveform is above the threshold, the higher the expression stored. The integrating system can be adjusted to compensate for the higher frequency and thus the lower counts of the treble notes by setting the basic threshold of the treble comparator slightly lower than that of the bass. The system also compensates for the playing of more than one note by counting the number of notes played and automatically raising the threshold when the multiple notes are sounded.

Finally, the key data from the key switch multiplexer is applied to a pair of serially connected 128-bit shift registers. The output of the first shift register is supplied to the second shift register and to an OR gate along with the output of the second shift register so that every key switch closure or actuation extends over two time frames and is, in effect, a note stretcher. This note stretching removes the very sharp and mechanical sound from short notes.

BRIEF DESCRIPTION OF THE DRAWINGS

The above and other objects, advantages and features of the invention will become more apparent when considered in conjunction with the following specification and accompanying drawings wherein:

FIG. 2 is a bit (or data cell) assignment chart, for each frame of multiplexed data.

Referring now to FIG. 1, the keyboard of a piano (not shown) is designated by the numeral 10 as a keyboard data source. It could be any musical instrument such as a harpsichord, carillon, organ, piano, etc. and each output or switch actuation is indicated by a single line 11-1 through 11-N, the number of such output lines corresponding to the number of key switch actuations to be sensed and recorded, for example, 80 keys for the notes 4–84 of a standard piano, the notes at each extreme end of the keyboard not being recorded but they could very easily be recorded in the 128-bit frame format utilized herein (see FIG. 2). In addition, the "sustain" and "soft" pedals may be equipped with similar switches and the actuation of these switches sensed in the same way.

Multiplexer 12, which is supplied by timing pulses from a clock or timing source 9, looks at or scans each individual line 11-1 . . . 11-N in a time sequence which constitutes a frame. Thus, the key switches, the sustain and soft pedal actuations are sensed by the digital multiplexer 12, one at a time, and in a generally sequential fashion. If no transpositions are contemplated, it is not necessary that they be sequentially scanned, they may in this case be looked at or scanned in groups in any fashion or order, the only criteria being that the position of the particular switch in its scan time be maintained in the entire system. FIG. 2 illustrates the bit assignment chart for 88 keys of the piano, and as indicated above, only notes 4–84 need be utilized for accurate and satisfactory reproduction of the music being played, although the entire keyboard may obviously be utilized.

As illustrated in FIG. 2, bit positions 1 and 2 are for the soft and sustain pedals. Bit position 3 is a spare bit and is simply not used in this embodiment. Bit positions 4–8 are 5-bit positions which are utilized for the bass expression, the first bit position of the bass expression group, bit position 4, being the least significant bit ("LSB") and bit position 8 being for the fifth bit of the bass expression group and records the most significant bit ("MSB"). Bit positions 9 through 16 are spare bits and may be used for recording, for example, the four bass notes which are not used in this embodiment. Bit positions 17 through 56 are used for recording the bass note key switch actuations. It will be noted that in this embodiment the bass note expression bits are recorded close to the bass note key switch actuations themselves.

Figure 1:
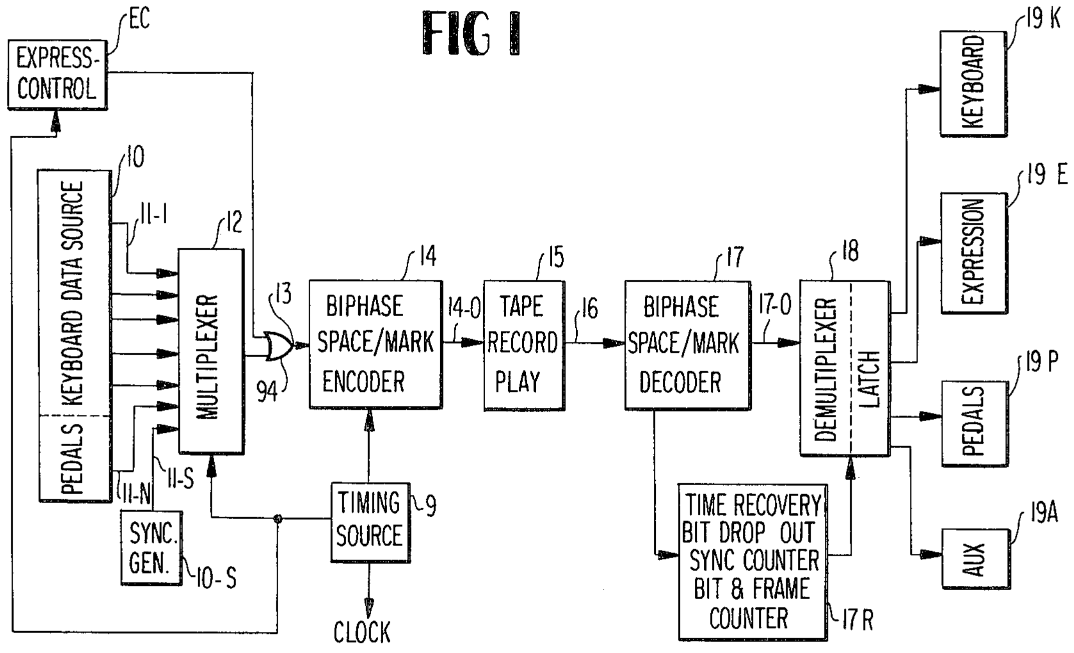
FIG. 1 is a diagrammatic block diagram of a player piano recorder system to which the invention has been applied.

Bit positions 57–64 are spare bit positions and may be used for inserting other data into each frame, if desired. Bit positions 65 and 66 are used for recording the digital code word identifying the particular format of roll music which may be transcribed. In the case of a normal recording according to the present invention, these bit positions are not used. Bit position 67 is a spare bit position and is not used. Bit positions 68–72 are used to record the treble expression bits, with the first bit being the least significant bit ("LSB") and the fifth bit being the most significant bit ("MSB"). Bit positions 73–112, inclusive, are used for recording the treble note key switch actuations. Bit positions 113–120 are spare bits and bit positions 121–128 are for storing the synchronization bits.

Referring again to FIG. 1, a synchronizing generator 10-S which generates the sync word shown in bit positions 121–128, supplies the sync word on lines 11-S to the multiplexer. The pedal controls for the sustain pedal and the soft pedal are recorded in bit positions 1 and 2 as indicated above.

Expression bit information from the expression control circuit EC of the present invention which will be described more fully hereafter is combined via OR gate 94 (see FIG. 5) to form the data frame shown in FIG. 2. The output from the OR gate 94 on line 13 is supplied to an encoder 14, which is preferably a bi-phase space/mark encoder. The output of the encoder on line 14-O is supplied to a tape recorder and playback unit 15 which records the encoded data on line 14 on a magnetic tape cassette (not shown). The information which is recorded on the magnetic tape are serial frames of data which have the bit assignments shown in FIG. 2. Since the data is encoded in a bi-phase space/mark encoder, it is a self-clocking signal which has sharp transitions in the magnetic flux at the beginning (or end) of each bit position or data cell with a transition or an absence of a transition in the middle of a data cell constituting the recorded key switch actuations, expression bits, etc. information. Such an encoding system is disclosed in the "Service Manual" for Teledyne Piano Recorder/Player Model PP-1, Assembly No. 3288 ATL3263, a publication of the assignee hereof and U.S. application Ser. No. 681,093 by J. M. Campbell, filed Apr. 28, 1976, both incorporated herein by reference.

During playback, the tape is placed in the tape recorder/playback unit 15 and the encoded data appears on the output of the read head and is fed through conventional correcting networks and amplifiers to recover the digital signal which appears on the output line 16. This signal has included therein the clock data as part of the encoded signal and when this clock signal is recovered it is used along with the other information not here relevant in time recovery circuit 17-R and supplied to demultiplexer and latch circuits 18. In this commercially available unit, the data from the decoder 17 is supplied on output lines 17-O to the demultiplexer unit 18 which distributes the data to the appropriate control channels and the storage and solenoid actuator circuits 19-K, for the keyboard data, 19-E for the expression data, and 19-P for the pedal data, and 19-A for the auxiliary data which may or may not one of the unassigned bits shown in the data assignment chart of FIG. 2. While in the present invention it is preferred that the bass expression bits be recorded close to and in advance of the bass bits and that the treble expression bits be recorded as close to and in advance of the treble notes, this is not a necessary requirement of the invention. However, it does assure that a more faithful rendition of the music as originally played is performed in the playback mode.

Figure 3:
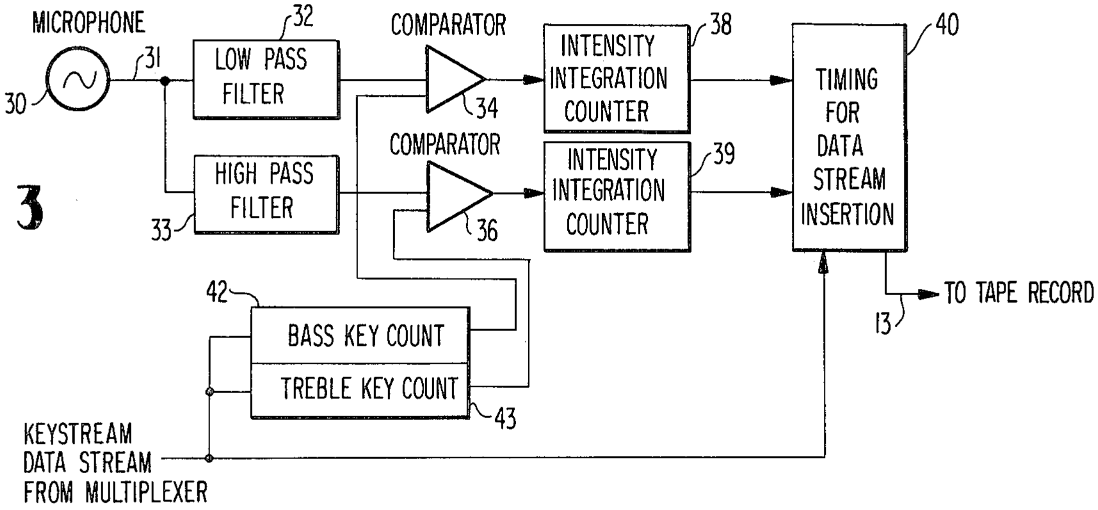
FIG. 3 is a block diagram of the expression recording circuit incorporating the invention, FIG. 4 are waveform diagrams which illustrate the basic principle of the expression recording system of the present invention.
Figure 4:
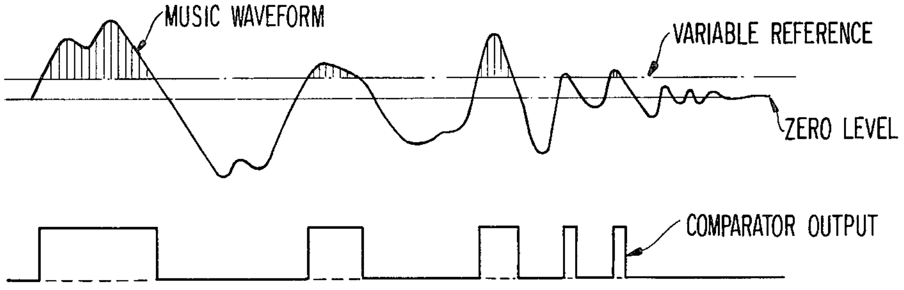

Referring now to FIG. 3, a block diagram of the expression detecting and encoding circuit is shown and includes a simple microphone 30 for detecting the acoustic wave as produced by the striking of one or more notes of the keyboard of a piano, for example. This acoustic wave is supplied on line 31 to a low pass filter 32 for the bass notes and a high pass filter 33 for the treble notes. The outputs of these two filters are respectively applied to comparators 34 and 36 which, with integration counters 38 and 39, perform a digital integration of the waveform (see FIG. 4). The electrical waveforms from the microphone as passed by the low pass filter 32 and the high pass filters 33 can take the form shown in FIG. 4. The other input to the comparator is an adjustable or programmable threshold level. Whenever the music waveform shown in FIG. 4 is greater than the threshold, a clocking circuit is allowed to advance a counter (described in greater detail in connection with FIG. 5) which is a binary 5-count unit with a 31-count range. The counting system is adjusted by presetting the basic d.c. level so that the maximum volume required from the piano produces the maximum count (31) from the counter. Thus, the longer the music waveform is above the threshold, the higher the expression stored. This integrating system can be adjusted to compensate for the higher frequency and thus the lower counts of the treble notes by setting the basic threshold of the treble comparator slightly lower than that of the bass comparator. The reason for this is that the treble notes have to be struck harder to get the same volume as the bass. Thus, in the block diagrams herein shown, the intensity integration counters 38 and 39 thereby produce a group of data bits which are the binary value for the intensity level to be recorded. These signals are then applied to a timing for data stream insertion circuit 40 which combines the key switch data stream with the expression bit, both treble and bass, and supplies the frames of time division multiplex frames of data on line 41 to the bi-phase encoder of FIG. 1. The system also compensates for the playing of more than one note by counting the number of notes played and automatically raising the threshold when multiple notes are sounded and as shown in FIG. 3, the key switch data stream is supplied to a bass key count circuit 42 and a treble key count circuit 43 which, as shown in FIG. 5 includes the system for setting the threshold level of the comparators 34 and 36, respectively.

Figure 5:
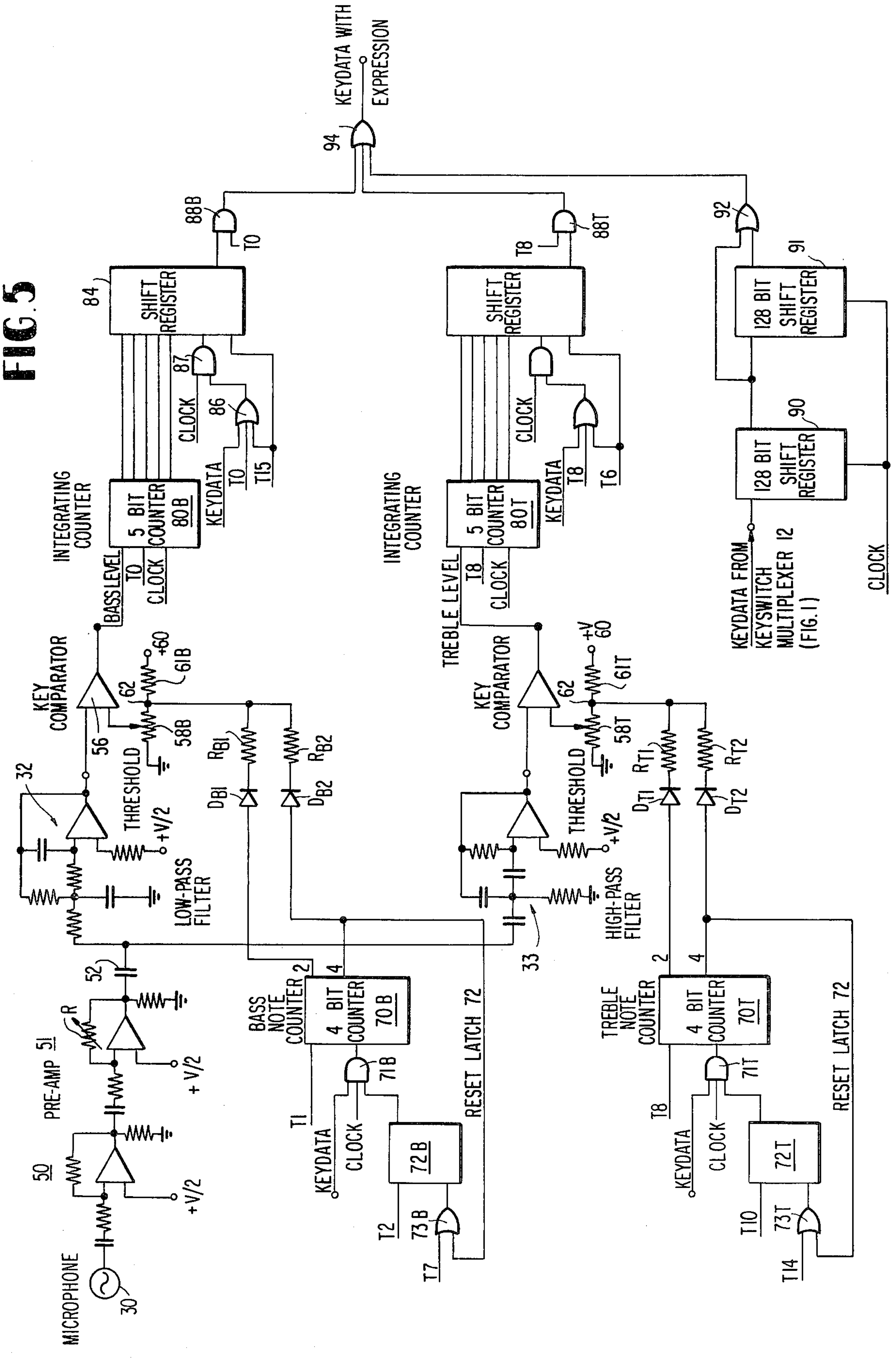
FIG. 5 is a schematic block diagram of a circuit which incorporates the invention.

Referring now to FIG. 5, microphone 30 has its output coupled through a pair of tandem-connected pre-amplifiers 50 and 51, respectively, the feedback resistor R of pre-amplifier 51 being adjustable for signal compensation purposes. The output of the pre-amplifier 51 is coupled via a coupling capacitor 52 to a low pass filter network 32 of conventional design to provide a low frequency below 330 Hertz and through a high band pass filter 33 to provide a high frequency portion, above 330 Hertz of the music waveform. The filter outputs are fed to a key note comparator circuit, 56 for the bass notes and 57 for the treble notes. The integrating counters develop a numerical value for the intensity of the bass and treble notes being played. The audio portion of the expression recording circuit uses operational amplifiers, such as National Semi-Conductor 324A, to realize both the pre-amplifier for a microphone output, the active low pass and high pass filters 32 and 33, and the key note adjustment comparators 56 and 57, respectively. As noted above, the key note comparators 56 and 57 provide a threshold with which the filter outputs are compared to enable the integrating counter and the output of the key comparator is shown in FIG. 4. The variable reference level is adjusted in the first instance by a potentiometer 58 from d.c. source 60 which is connected via dropping resistor 61 to a common point 62. The threshold is adjusted based upon a number of keys played to scale the integrator output count appropriately. The integrator works by simply counting the amount of time that the filter output signal is above the threshold level and storing this count to be inserted in the data stream along with the key data and at the proper time.

In the multiplexer shown in FIG. 1, as disclosed in the application of J. M. Campbell, Ser. No. 681,093, filed Apr. 28, 1976, while there are 128 data bits or time cells in each frame, these are divided into sixteen units of eight cells each, and there are produced in the timing circuit of the multiplexer sixteen timing pulses which are denoted T0 . . . T-15 (see FIG. 2 for the relative position of these pulses) and these identify the timing of the beginning of each group of words as follows:

| T0 | T1 | T2 T3 T4 T5 T6 | T7 |
|---|---|---|---|
| Bass Expression | Spare | Bass Note Key Data | Spare |
| **T8** | **T9 T10 T11 T12 T13** | **T14** | **T15** |
| Treble Expression | Treble Note Key Data | Spare | Synchword |

The above times are indicated at various places in FIG. 5 and provide the timing for setting the variable threshold of the key comparator as well as providing the time for insertion of the expression data bits in the key data stream from the multiplexer.

It is noted that the bass expression is initiated at time T0 and at time T1, a bass note counter (4-bit counter 70) is initiated or turned on to begin counting bass notes. The purpose of the 4-bit bass note counter 70 is to provide two separate outputs, one at count 2 and one at count 4 so as to adjust the level of the key comparator input and thereby adjust the intensity level of the bass notes. Thus, at the occurrence of time signal T1, the counter 70 is enabled. The key data or key switch actuations as delivered from the multiplexer is supplied to AND gate 71 along with the clock signals. In addition, a latch circuit or reset circuit 72 supplies a third input to AND gate 71. Hence, the AND gate 71 passes the key data upon the occurrence of the clock data so that this data is clocked into the 4-bit counter 70. While there is disclosed a 4-bit counter with only two outputs utilized, e.g., the 2-bit count and the 4-bit count, this could be any number of outputs used for providing any number of levels of voltage to the variable threshold summing point 62. The latch circuit 72 is set initially by pulse T2 and reset of count 4 from the 4-bit counter 70 via OR gate 73 or by the occurrence of time pulse T7 at the end of the bass notes in the time frame. Hence, in the initial state, the threshold level to the key comparator is set by potentiometer 58. On the occurrence of bass notes in the playing of music, one note played in the bass produces no change in the threshold level. However, if there are two notes played in the bass end of the keyboard, there will be an output on the two output of the bass note counter 70 which through the diode $D_{B1}$ and resistor $R_{B1}$ indicated adjust the level of the voltage at summing point 62. When a third note has been struck, in the same time frame, there is no change in the threshold level, but upon the striking of a fourth note or any greater number, an output appears on the 4-count output of the 4-bit counter which via diode $D_{B2}$ and resistor $R_{B2}$ adjusts the threshold level at summing point 62, and, simultaneously, resets the latch circuit 72, which is also reset by timing pulse T7 at the end of the bass notes.

The same circuit is utilized for adjusting the threshold level for the treble note counter. In this case, the 4-bit counter is set initially or enabled by time pulse T8. Time pulse T10 is used for resetting the latch circuit 72T and the time pulse T14 is used to reset it at the end of the treble notes. It is also reset in the same way by the occurrence of a 4-bit count.

INTEGRATING COUNTER

The bass level from the output of the key comparator 56 is applied to integrating counter 80 which, in the first instance, has been cleared or reset by the timing pulse signal T0. In addition to the bass level signals are applied to an input terminal of the 5-bit counter 80. The counter portion provides thirty-two expression levels. With reference to FIG. 4, the time width of the comparator output as applied to the bass level input to the integrating counter 80 is as long as it is high or up, the clock pulses step the counter up to a 32-count level to provide thirty-two expression levels. This counter output is parallel shifted to shift register 84 to provide a parallel to serial conversion every time the 5-bit counter 80 is cleared or reset by the timing pulse signal T0. The shift register 84 has then stored in it the bass expression data. As controls for the shift register 84, there is provided an OR gate 86 to which is applied the key data or key switch actuations, the timing pulse T0 and the timing pulse T15. The pulses from the shift register 84 are supplied in serial order form to AND gate 88 which has as the other input thereto the timing pulse T0. Thus, the pulse T0 enables AND gate 88 at the proper time in the frame of the serial data stream of key switch actuations. The same system is used for providing an integrating counter and outputs for the treble notes.

NOTE STRETCHING

To provide time for the expression circuitry to perform its functions, the key switch data stream is sent through two 128-bit shift registers 90 and 91 before the expression data is inserted. Shift registers 90 and 91 are connected in series with the output of shift register 91 being applied to OR gate 92 and also as the input to the shift register 91. The output of shift register 91 is applied as a second input to OR gate 92 so that the data stream which appears on the output of OR gate 92 is the key data which has been stretched every key switch closure one frame. Thus, OR gate 92 tells what the last frame did and also tells what happens to one bit in the next succeeding frame. These signals are supplied to OR gate 94 which also has as inputs thereto the outputs of AND gates 88B and 88T. The timing applied to AND gate 88B by timing pulse T0 permits the expression bits in shift register 84 to be merged or added to the stream of data issuing from the OR gate 92 in bit positions 4–8, inclusive, as illustrated in the digital multiplex word format or bit assignment chart shown in FIG. 2. In the same way, the treble expression bits stored in shift register 84T are gated by AND gate 88T and the timing pulse T8 to merge with the stream of key data from the OR gate 92 in bit positions 68–72 of the bit assignment chart shown in FIG. 2.

The shift registers 90 and 91 stretch the duration of any note by ORing the outputs in OR gate 92 to thereby remove very sharp or rather mechanical sounds from the short notes. The key count information used to adjust the d.c. compare level by counters 70B and 70T are timed to count the bass and treble notes being played at any given time. The bass and treble note information are combined with the key switch actuations and inserted in the data stream very close to the times when the bits are played which can be a significant improvement over the prior art since in the prior art bit assignment chart and format, the treble and bass information occurred or was positioned in the data stream after the occurrence of the notes to have been played and the present improvement is an important contribution to the art in achieving a more faithful rendition of the music as originally recorded.

It is to be understood that the foregoing description is illustrative of a preferred embodiment of the invention, many other obvious variations of the invention being suggested to those skilled in the art by the disclosure hereof without departing from the inventive concept, the scope of which is to be determined by the appended claims in light of the prior art and the specification contained herein.

What is claimed is:

1. In an apparatus for recording the expression effects of a musical presentation constituted by the manual actuation of note generating devices of a musical instrument, said apparatus including means sensing the manual actuation of each of the notes and producing a serial digital data stream of electrical signals in time division multiplexed frames of data and means for sensing the volume intensity of the music produced, the improvement comprising means for converting the volume intensity of the music produced as sensed by said sensing means to digital signals and storing same, means for temporarily storing each frame of data, first timing means for causing the removal of the frames of data from said means for temporarily storing, second timing means for causing the removal of said stored digital intensity signals in serial form, and means for merging said frames of data from said means for temporarily storing with the said serial form of stored digital intensity signals.

2. The invention defined in claim 1 including means for splitting signals as sensed by said sensing means into treble notes and bass notes, said means for converting including means for converting the treble note signals and the bass note signals, respectively, into a pair of serial forms of data which are merged with said frames of data.

3. The invention defined in claim 1 wherein said means for sensing is a microphone means and said means for converting includes a comparator means, means for connecting the output of said microphone means to one input of said comparator means, a variable voltage source connected to the other input of said comparator means so that at any time the music intensity level is above the level of said variable voltage source there is an output signal from said comparator, and means for transforming the output of said comparator to said digital signal.

4. The invention defined in claim 3 wherein said variable voltage source includes a fixed direct current voltage source and a voltage divider with the output of the voltage divider being connected to the input of said comparator.

5. The invention defined in claim 4 including means for counting the number of manual actuation of notes in at least a selected portion of a frame of data, and means for adjusting the level of voltage applied to said comparator from said voltage divider according to the number of notes played.

6. The invention defined in claim 5 including means for splitting the signals from said microphone into a bass signal and a treble signal and said converting means includes a treble signal flow path for said bass signal and treble signal flow path for said treble signal, each signal flow path including a comparator means, a means for connecting a variable voltage source and means for transforming for each said bass signal and said treble signal digital signals.

7. The invention defined in claim 6 including means in one of said signal flow paths for adjusting the level for one of said comparators to a different level to accommodate the higher frequency of the treble notes as relative to that of the bass notes.

8. An expression digitizing circuit for a musical instrument comprising (a) transducer means for producing an electrical waveform proportional to the acoustic waveform,
(b) comparator means for comparing said electrical waveform with a selected voltage level and producing an output signal voltage having a time duration proportional to time the amplitude of said electrical waveform is above said selected,
(c) means converting said output signal voltage to a binary signal representing the intensity of said acoustic waveform, and
(d) means for counting the number of notes played on said musical instrument within a selected time period and adjusting said selected level in accordance with the number of notes counted in said selected time period.

9. An expression digitizing circuit for a musical instrument comprising (a) transducer means for producing an electrical waveform proportional to the acoustic waveform,
(b) comparator means for comparing said electrical waveform with a selected voltage level and producing an output signal voltage having a time duration proportional to the time the amplitude of said electrical waveform is above said selected level,
(c) means converting said output signal voltage to a binary signal representing the intensity of said acoustic waveform, and
(d) means for splitting said electrical waveform into a portion representing bass notes and a portion representing treble notes, and said comparing means comparing separately each of said portions against their respective selected voltage levels to produce a bass output signal voltage having a time duration proportional to the bass note content of said acoustic waveform and a treble output signal voltage having a time duration proportional to the treble note content of said acoustic waveform.

10. The invention defined in claim 9 including means for adjusting the selected voltage levels, respectively, for said bass and treble note comparisons.

11. In a method for recording the expression effects of a musical presentation constituted by the manual actuation of note generating devices of a musical instrument, said method including first sensing the manual actuation of each of the notes and producing a serial digital data stream of electrical signals in time division multiplexed frames of data and second sensing the volume intensity of the music produced, the improvement comprising converting the volume intensity of the music produced as sensed by said first sensing to digital signals and storing same, temporarily storing each frame of sensed manual actuation data, causing the removal of the frames of data from said temporary storage and, at a selected time, the removal of said stored digital intensity signals in serial form, and merging said frames of manual actuation data from said temporary storage with the said serial form of stored digital intensity signals.

12. The invention defined in claim 11 including splitting said signals as sensed by said second sensing into treble notes and bass notes, converting the treble note signals and the bass note signals, respectively, into a pair of serial forms of digital data which are merged with said frames of data, the bass note expression data being merged in said frames at a position near the bass note manual actuation data and the treble note expression data being merged in said frames of data at a position near the treble note manual actuation data so that upon playback a more faithful re-creation of the original musical presentation is produced.

13. In a method of binary recording the bass and treble note expression effects of a stringed musical instrument, the improvement comprising compensating the binary signals produced by the treble notes for the dynamic difference between treble note strings and bass note strings.

* * * * *